March 21, 1939.    G. J. WEIDNER    2,151,251
UNIVERSAL BORING TOOL
Filed March 8, 1937    3 Sheets-Sheet 1
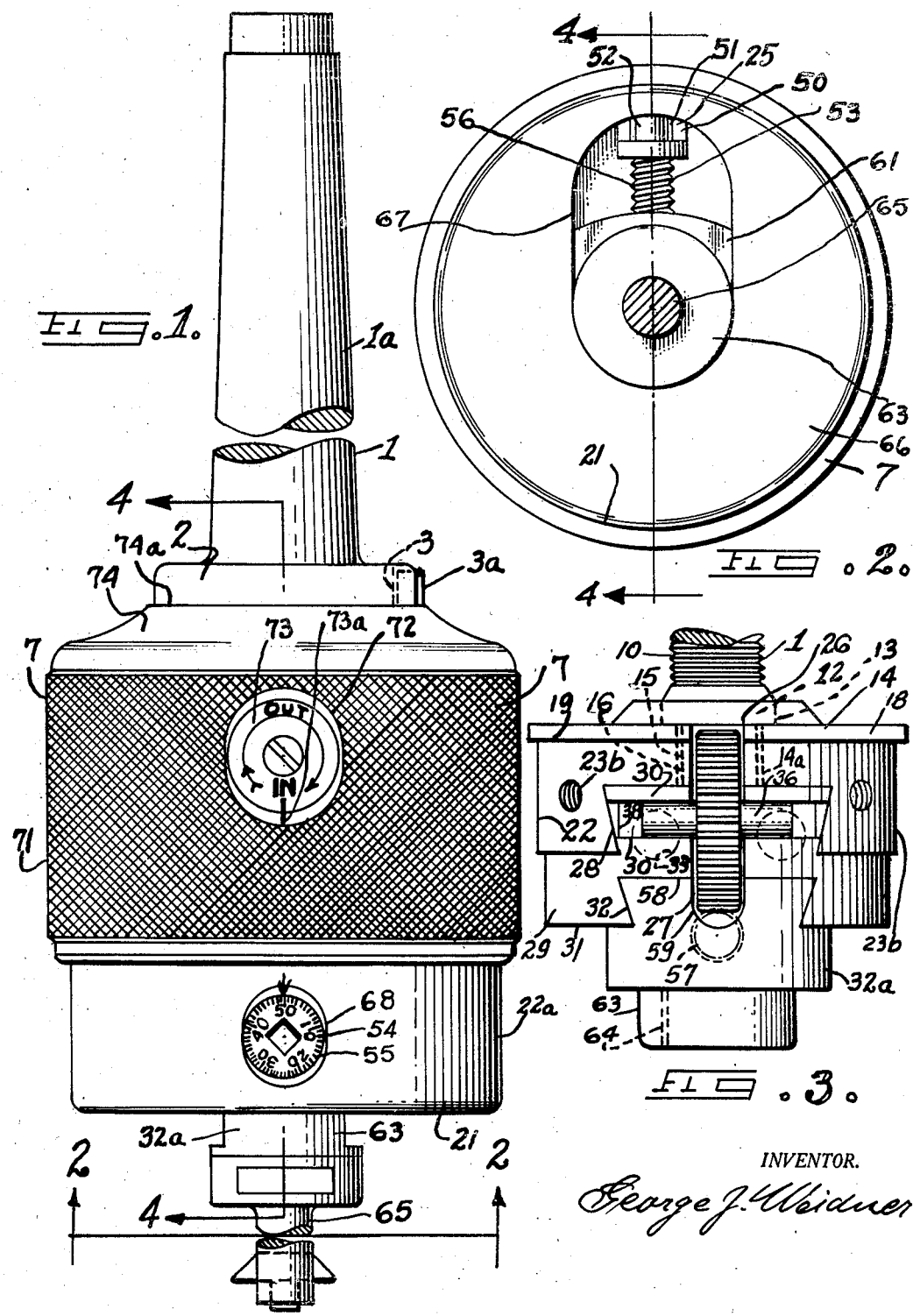
INVENTOR.
George J. Weidner March 21, 1939.  G. J. WEIDNER  2,151,251
UNIVERSAL BORING TOOL
Filed March 8, 1937  3 Sheets-Sheet 2
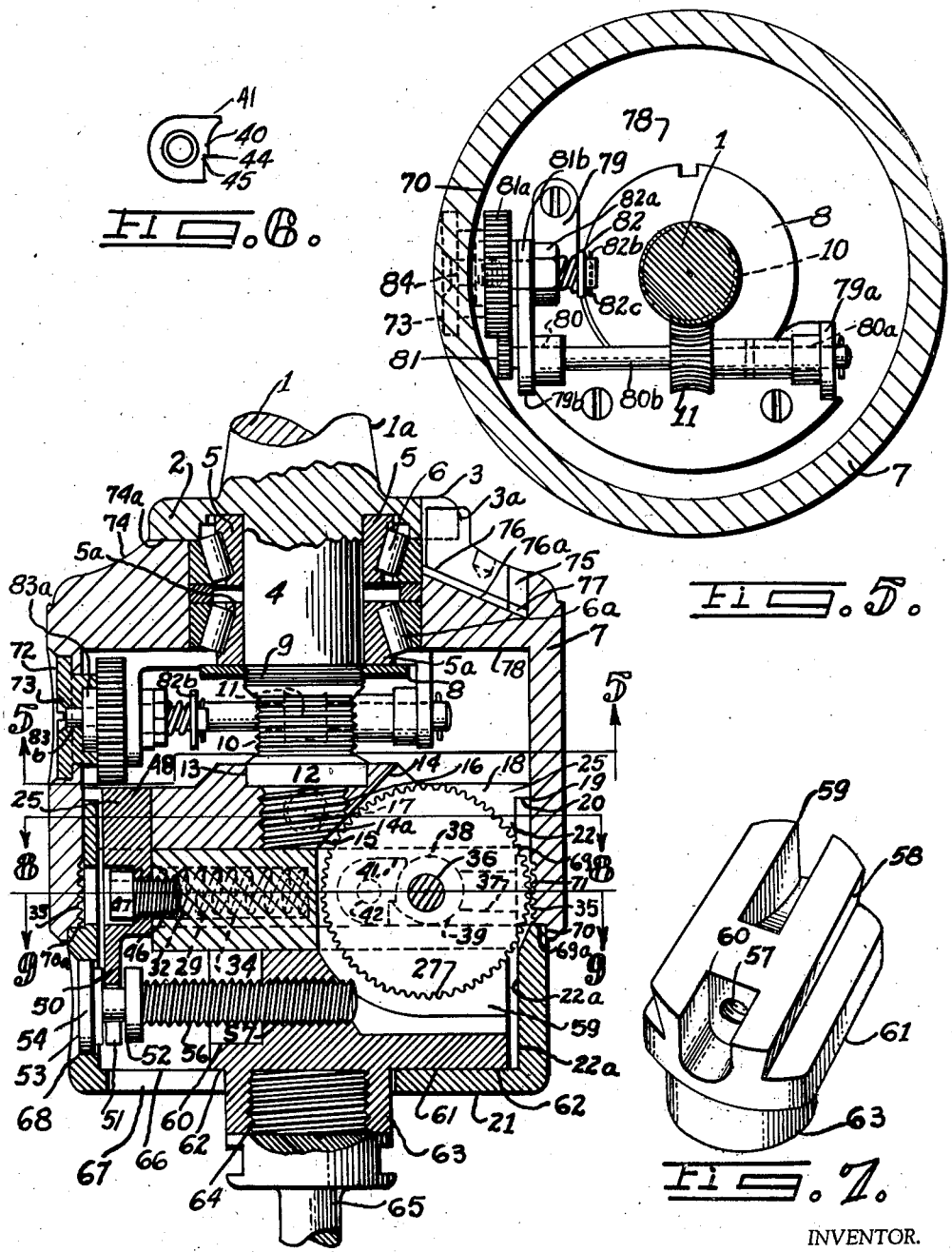
INVENTOR.
George J. Weidner March 21, 1939. G. J. WEIDNER 2,151,251
UNIVERSAL BORING TOOL
Filed March 8, 1937 3 Sheets-Sheet 3
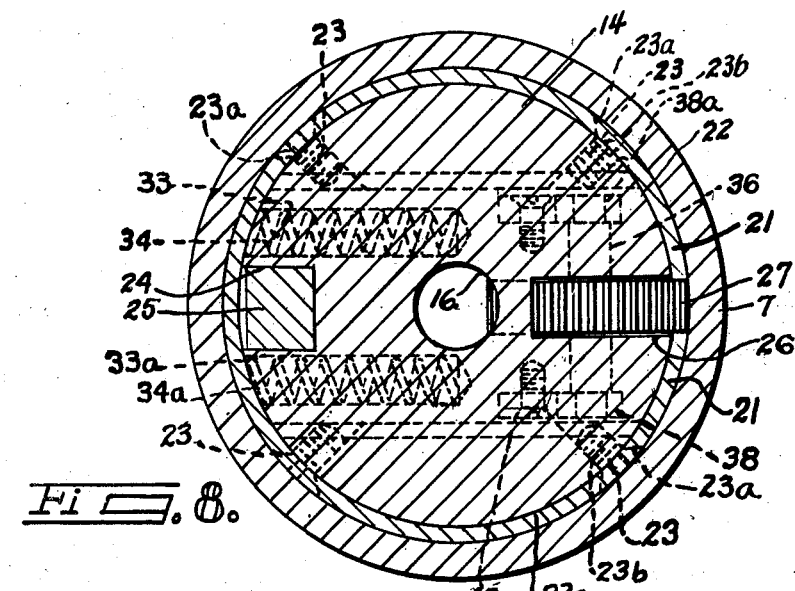
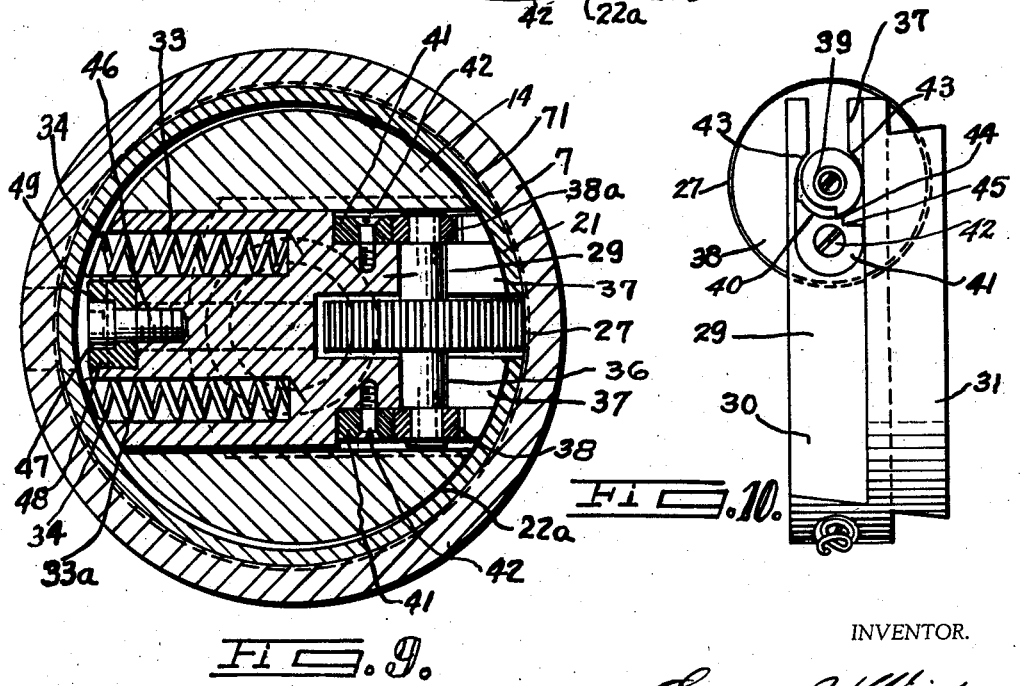
INVENTOR.
George J. Weidner Patented Mar. 21, 1939

2,151,251

UNITED STATES PATENT OFFICE 2,151,251

UNIVERSAL BORING TOOL

George J. Weidner, Cincinnati, Ohio

Application March 8, 1937, Serial No. 129,629

5 Claims. (Cl. 279—6)

My invention relates to that type of tools known as eccentric boring bars and more particularly to boring tools adapted to drill and bore cylindrical and taper holes.

Specifically it is the object of my invention to provide an adjustable boring tool adapted to bore taper holes in either direction in material having a straight sided hole. Another object is to provide an adjustable eccentric boring bar capable of boring holes of various diameters having straight internal sides and adapted to be converted into a taper boring tool to taper the straight sides of holes of various diameters.

The object of this invention is to provide a tool adapted to be used on the usual metal working machinery to bore holes of various diameters and without disturbing the setting of the machine tool or the work operated upon proceed to taper the hole by a simple release of certain mechanism forming part of my invention which will cause the cutting element of my boring bar to move transverse to the longitudinal center line and line of travel of the hole being bored.

Holes may be bored to any required diameter and then by the use of my invention a taper hole can be produced. In fact, my invention permits the boring of straight or taper holes without resorting to the use of reamers or the changing of the setup of the machine used to bore holes.

These and other objects will become more apparent as the description proceeds, reference being had to the drawings illustrating a preferred embodiment and forming a part of this specification.

In the drawings:

Figure 1 is a front elevation of the boring tool.

Figure 2 is a bottom view of my boring tool taken on the line 2—2 of Figure 1.

Figure 3 is a vertical elevation of the internal mechanism of my boring tool.

Figure 4 is a vertical sectional view taken on the lines 4—4 of Figures 1 and 2.

Figure 5 is a horizontal sectional view taken on the line 5—5 of Figure 4.

Figure 6 is a detail of the cam shoe.

Figure 7 is a detail in perspective of the cutter supporting slide.

Figure 8 is a horizontal sectional view taken on the line 8—8 of Figure 4.

Figure 9 is a horizontal sectional view taken on the line 9—9 of Figure 4.

Figure 10 is a sub-assembly view of the slide supporting the gear and cam mechanism.

While I have shown a particular embodiment of my invention other variations and adaptations will occur to those skilled in the art. Certain limitations will appear by virtue of the description but it will be readily understood that my device can be made so as to vary the degree and length of taper by a mere change in size of the elements to produce the desired result.

I have shown a shaft 1 with a tapered shank 1a to fixedly mount my boring tool in the spindle of a machine tool. The shaft has a flanged section 2 having a key slot 3 for a key 3a for purposes to be described. A part of the shaft provides a bearing section 4 upon which are fixedly pressed inner races 5 and 5a of roller bearings 6 and 6a. These roller bearings rotatably support a hollow cylindrical housing 7 to be described. The inner races of the roller bearings are held from lateral movement on the shaft by means of a lock-nut 8 that is screwed upon a thread 9 that is cut on the shaft. On the shaft there is cut a worm section 10 for driving a worm gear 11 for purposes to be described. Adjacent the worm section there is a shoulder 12 for positioning the shaft in a counterbore 13 of a cylindrical plug 14 to be described. At the end 14a of the shaft there is a thread 15 that screws into a threaded hole 16 and fixedly mounts the shaft in the cylindrical plug 14. The shaft is held in a fixed and non-rotatable position in the cylindrical plug by means of a set-screw 17 that is screwed and mounted in the cylindrical plug.

The cylindrical plug 14 has a flange section 18 that provides a shoulder 19 that fixedly contacts on a top 20 of a hollow lower casing 21 to be described. A main body portion 22 extending from the flange section 18 snugly fits into and contacts an inner side of a wall 22a of the lower casing 21. The plug is held in a fixed and non-rotatable position with relation to the lower casing by means of screws 23 through holes 23a in the wall 22a that are screwed into tapped holes 23b in the plug, see Figure 8. In the plug there is a slot 24 for slidably retaining a stop 25. Another slot 26 is provided for slidably retaining a gear 27. In the bottom end of the plug there is a dovetail groove 28 that slidably retains a gear block 29.

The gear block has a dovetail 30 for slidably mounting it in the dovetail groove 28 of the plug. On the bottom side of the gear block there is also a dovetail groove 32 for slidably retaining a tool slide 32a to be described. Holes 33 and 33a for compressibly retaining springs 34 and 34a are provided in the gear block. These springs bear on the inner wall 22a of the lower casing and keep the gear 27 in mesh with a worm 35 cut on the rotatable housing 7 by forcing cam shoes against cams to be described.

The gear 27 is fixed on a shaft 36 that is slidably and rotatably mounted in a slot 37 in the gear block. On the ends of the shaft 36 cams 38 and 38a are fixedly mounted and in turn rotate with the gear. The surface 39 of the cams slidably contact the arcuate surfaces 40 of cam shoes 41 that are fixedly mounted on the gear block by means of the screws 42. Rotation of the cams by the gear will move the gear block to left. The surfaces of the cams are held in contact with the surfaces of the cam shoes by means of the pressure obtained from the springs. Referring to Figure 10 it will be seen that the cam is at the high point and ample clearance 43 behind the cam is provided. This clearance will be greater when the cams drop off high points 44 into low points 45 on the cam shoe.

A tapped hole 46 in the gear block is provided for a screw 47 that is used to fixedly mount the stop 25. When fixed to the gear block it provides a means for adjusting the tool slide to be described. The stop has a main body portion 48 with a counterbored hole 49 for fixing it to the gear block. A section 50 thinner than the main body portion depends and has a slot 51 which is inserted in an annular groove 52 in the head of an adjusting screw 53. The stop prevents the screw from moving transversely in relation to the gear block and is the means by which the tool slide is moved transversely during adjustment with relation to the gear block.

The adjusting screw has a main head portion 54 which is shown with graduations 55 so that a tool can be moved micrometrically a determined amount. Adjacent the head portion is the annular groove into which the the stop depends. Extending from the grooved section is a threaded portion 56 that screws into a threaded hole 57 provided in the tool slide.

The tool slide has a dovetail 58 that is slidably mounted in the dovetail groove of the gear block. In the dovetail there is a clearance slot 59 for free rotation of the gear 27. The threaded hole 57 for the adjusting screw is provided with a counterbore 60 so that it will not interfere with the head of the adjusting screw when the tool slide is moved to the extreme left as can be seen by referring to Figure 4. While the tool slide is adjustable with relation to the gear block it is held in a fixed relation thereto by means of the adjusting screw during a boring operation. The under surface 61 is slidably in contact with the inside bottom surface 62 of the lower casing and depending from the surface 61 is a boss 63 having a threaded hole 64 for mounting a cutting tool post 65. While I have shown the usual type of fly cutter it is also possible to use a chuck for mounting the well known type of drills in order to drill straight holes.

The hollow lower casing 21 has the upwardly extending wall 22a and a bottom 66. In the bottom there is an elongated hole 67 that allows the boss on the tool slide to move laterally in either direction in relation to the longitudinal axis of the boring tool. In the side wall 22a there is a hole 68 through which the head of the adjusting screw is rotatably mounted and made accessible for adjusting the tool slide to vary the radii of swing of the tool and thereby bore holes of various diameters. A slot 69 in the side wall 22a is provided for the gear 27 which extends beyond the side wall 22a. This permits the gear to mesh with the worm on the housing. A shoulder 69a on the lower casing extends into a counterbore 70 on the housing and there is clearance between them to permit it to rotate without turning the housing 7. As has been stated, the hollow casing is fixed to the plug and the plug in turn is fixed on the shaft. Since the gear block is slidably but non-rotatably supported by the plug and the tool slide is slidably but non-rotataby supported on the gear block it will be understood that the shaft, the plug, the gear block, the tool slide and the hollow casing will rotate as a unit when the boring tool is operating as a taper boring tool which will be more specifically described.

The cylindrical housing 7 has the counterbore 70 providing an annular space 70a that permits the housing to be held stationary during a taper boring operation while the lower casing is revolving. In the side wall 71 there is an aperture 72 in which is rotatably mounted a dial 73 for purposes to be described. On the side of this aperture there is a gage mark 73a that indicates the amount of rotation of the dial which in turn indicates the movement of the gear block and the cams thereon. On the top 74 there is a bearing surface 74a that slidably contacts the underside of the flange section 2. This flange section and the shoulder on the lower casing limit the longitudinal movement of the housing in relation to the shaft. The worm 35 is cut into the housing on the innerside of the side-wall 71 and as has been stated this worm is in mesh with the gear 27. When the key 3a is free from the key slot and the housing is held stationary the gear will rotate about the axis of the shaft and the gear itself will be rotated by the stationary worm on the housing.

The key 3a is slidably mounted in a T slot 75 cut in the top portion of the housing. Between a surface 76 on the key and a surface 76a on the housing there is a spring 77 that frictionally engages between these two surfaces and holds the key from movement when in or out of the key slot. When the key is in the slot as shown in Figures 1 and 4 the housing will be fixed with relation to all the elements of my boring tool and cause the housing to rotate and in which condition my boring tool will be a boring bar for boring straight sided holes of various diameters. When the key is disengaged from its slot the housing held stationary and the shaft with all its parts mounted thereon rotated the boring tool will then bore tapered side to holes of various diameters.

On the under side 78 of the housing there is fixed a bearing bracket 79 having bosses 79a and 79b in which there are holes 80 and 80a. In these holes there is rotatably mounted a shaft 80b. On the shaft there is fixedly mounted the worm gear 11 that is in mesh and driven by the worm 10 when the housing is held stationary after release of the key from its slot. On one end of the shaft there is fixed a gear 81 that meshes with and drives another gear 81a. The gear 81a is fixed on a shaft and this shaft is rotatably mounted in the bearing 81b. A spring 82 mounted over the end of the shaft and retained between a hexagon collar 82a and a washer 82b slidably retained on the shaft by means of a cotter pin 82c limits the lateral movement of the gears with relation to each other and also permits taking the gears out of mesh and change of the engagement of other teeth as required. On the end 83 of the gear there is a boss 83a over which is slidably mounted a dial having a counterbored hole 83b. A screw 84 extends through the dial and screws into a tapped hole in the gear and holds the dial in a set position so as to mark the proper in and out position of the tool that corresponds to the high and low points on the cams. "In" in this case being the position when the high point of the cam is in the low point of the cam shoe and "out" being the position where the high point of the cam is on the surface 40 of the cam shoe.

When it is desired to enlarge a straight sided hole with my boring tool the work is clamped in a machine tool in the usual manner. The key 3a is left in the slot which will cause the housing to rotate with the shaft. The cutting tool is then adjusted and brought into cutting position in the hole by means of the adjusting screw 56. The tool is then fed through the work or the work fed over the tool. This operation can be repeated until a hole of the desired size is obtained. When the hole is up to the required size and it must be tapered all that is necessary is to set the cutting edge so that it will start through the hole. It can be started on either side of the material depending upon what direction it is desired to taper the hole. The key 3a is then slid back out of the key slot 3.

The boring tool is then rotated by the machine tool. When the boring tool is up to speed the work is fed across the rotating cutting tool. Simultaneous with the starting of the feed the housing 7 is held stationary so that the cutting tool will move transversely its proportionate distance while the work is travelling a certain distance longitudinally.

When the housing 7 is held stationary and the shaft with the gear block and tool slide is rotated the gear 27 will ride around in mesh with the worm on the housing. For each revolution of the gear block the gear will turn a certain distance and with it the cams that are held in contact with the cam shoes by means of the springs. One complete revolution of the gear will cause the cam to turn through one revolution and push the gear block and the tool slide away from the center line of the boring tool. Since the work is travelling in a line parallel to the center line of the boring tool and the cutting tool is traveling away from the center line of the boring tool it will be understood that the hole from one side of the work to the other will be increasing in size and therefore a tapered hole will result.

At the start of the cut the gradient on the dial will be in the position shown in Figure 1. As the gear rotates the dial will also rotate because the worm gear rotating the dial will be driven by the rotating worm on the shaft. After the gear has made one complete revolution the high point of the cam will drop into the low point of the cam shoe and the springs will force the cutting tool back towards the center line of the boring tool and into the position at the start of cutting the taper hole. Actually the tool during the taper cutting operation is describing a spiral because the radius of swing is progressively increasing with each revolution of the shaft. It will readily be understood that a spiral helix can be cut with my boring bar.

Having thus described my invention I claim as new and novel and desire to secure by Letters Patent the following:

1. An eccentric boring and tapering tool adapted to bore cylindrical and taper holes of various diameters comprising a shaft, a plug fixed on said shaft and rotatable therewith, a gear block slidable on said plug and rotatable with said shaft, a gear rotatably mounted on said gear block and rotatable with said shaft, a tool support slidable on said gear block rotatable with said shaft, a casing fixed to and rotatable with said plug, a stop supported on said gear block, screw adjusting means coacting with said stop to vary the position of said tool support with said shaft, cams fixed to and rotatable with said gear to move said gear block and tool support with relation to said shaft when said gear is rotated, an annular housing rotatably mounted on said shaft and adapted to be held stationary while said shaft is rotating and a worm fixed inside of said annular housing to rotate said gear and cams while said annular housing is held stationary and said gear and cams are rotating with said shaft to move said gear block and tool support transverse to said shaft.

2. An eccentric boring and tapering tool adapted to bore cylindrical and taper holes of various diameters comprising a rotatable shaft, a plug fixed on said shaft and rotatable therewith, a gear block slidable on said plug and rotatable therewith, a gear rotatably and slidably mounted on said gear block and rotatable therewith, cams fixed to said gear and rotatable therewith to move said gear block in relation to said gear, a tool support slidably adjustable on said gear block and rotatable therewith, a casing fixed to said plug and rotatable with said shaft, a stop fixedly mounted on said gear block and rotatable therewith, and screw-adjusting means coacting with said stop to vary the position of said tool support with said shaft, an annular housing rotatable on said shaft adapted to be held stationary while said shaft is rotatting, a worm fixed inside of said annular housing to rotate said gear and cams and move said tool support transverse to said shaft while said housing is stationary and said gear and cams are rotating with said shaft, and resilient means for returning said tool support towards said shaft while said shaft is rotating.

3. An eccentric boring and tapering tool adapted to bore cylindrical and taper holes of various diameters comprising a shaft, a plug fixed on and rotatable with said shaft, a gear block slidable on said plug and rotatable with said shaft, a gear rotatable and slidably supported on said gear block and rotatable therewith, said gear being rotatable radially about and with said shaft, a tool support adjustably mounted on said gear block slidable therewith and rotatable with said shaft, cams fixedly mounted to said gear and rotatable therewith to move said gear block transverse to said shaft and said gear while said gear and shaft are rotating, a casing fixed to said plug encasing said gear block and tool support and rotatable with said shaft, a stop fixed to said gear block rotatable therewith and with said shaft, an adjusting screw rotatably mounted in said stop and said tool support and rotatable therewith to vary the relative position of said tool support with said shaft, a housing having annular walls rotatably mounted on said shaft and adapted to be held stationary while said shaft is rotating, a worm fixed to the annular wall of said housing to rotate said gear and cams when said housing is held stationary to move said tool support transverse to the axis of said shaft while said shaft is rotating.

4. An eccentric boring and tapering tool adapted to bore cylindrical and tapered holes of various diameters comprising a rotatable shaft, a plug fixed on said shaft and rotatable therewith, a gear block slidable on said plug and rotatable therewith, a tool holder adjustably mounted on said gear block and rotatable therewith, a casing for said gear block fixed to said plug and rotatable therewith, a gear slidable and rotatable with relation to said gear block and rotatable with said shaft, rotatable cams having a starting and ending position fixed to said gear and rotatable therewith and slidably contacting said gear block to move said gear block transverse to said shaft, a housing rotatable on said shaft adapted to be held stationary while said shaft, gear block and cams are rotating, a worm fixed to said housing to rotate said gear and cams while said housing is stationary and said shaft, gear block, gear and cams are rotating, to move said tool holder transverse to said shaft, and a spring compressed between said gear block and a wall of said casing to oppose the movement of the tool holder actuated by the cams and thereby return the tool holder to initial starting position automatically.

5. An eccentric boring and tapering tool adapted to bore holes of various diameters comprising a rotatable shaft, a plug fixed on said shaft and rotatable therewith, a gear block slidable on said plug and rotatable therewith, a tool holder adjustably mounted on said gear block and rotatable with said shaft, a casing fixed to said plug and rotatable therewith, a gear slidable and rotatable with relation to said gear block and rotatable with said shaft, cams having initial starting and ending positions fixed to said gear and rotatable therewith slidably contacting said gear block to move said gear block transverse to said shaft while said shaft is rotating, a housing rotatable on said shaft adapted to be held stationary while said shaft is rotating, a worm fixed to said housing to rotate said gear and cams while said gear block, gear and cams are rotated by said shaft when said housing is held stationary to move said tool holder transverse to said shaft while said shaft is rotating, and a spring compressed between said gear block and a wall of said casing to oppose the movement of the tool holder actuated by the cams to return the tool holder to initial starting position automatically and thereby permit the tool support to repeat the cycle of transverse movement without a resetting of the tool support.

GEORGE J. WEIDNER.